Oct. 12, 1937.  C. A. ROBERTS  2,095,268

ORTHOPEDIC PRESSURE DISTRIBUTION BALANCE

Filed Sept. 14, 1935  2 Sheets-Sheet 1

INVENTOR
Charles Alonzo Roberts

Oct. 12, 1937.                    C. A. ROBERTS                    2,095,268
ORTHOPEDIC PRESSURE DISTRIBUTION BALANCE
Filed Sept. 14, 1935          2 Sheets-Sheet 2
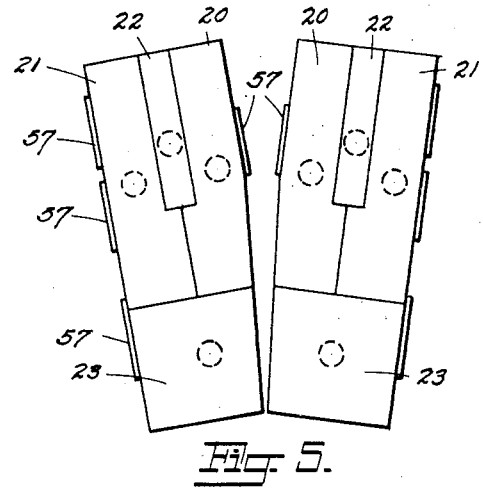
Fig. 5.
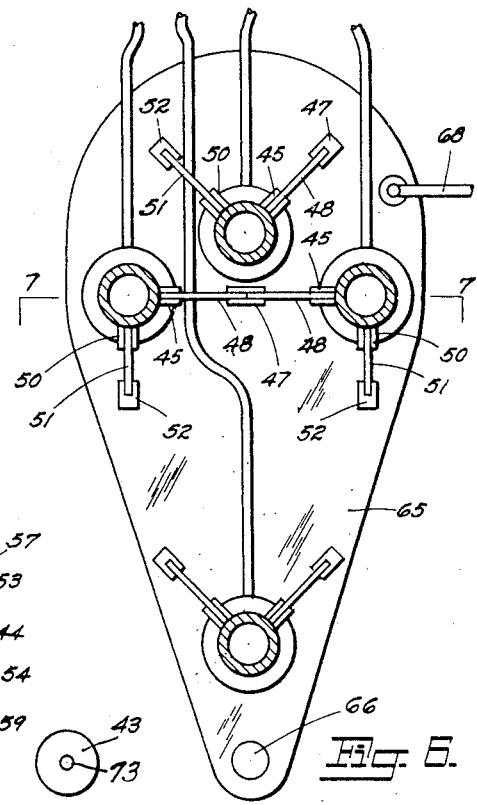
Fig. 6.
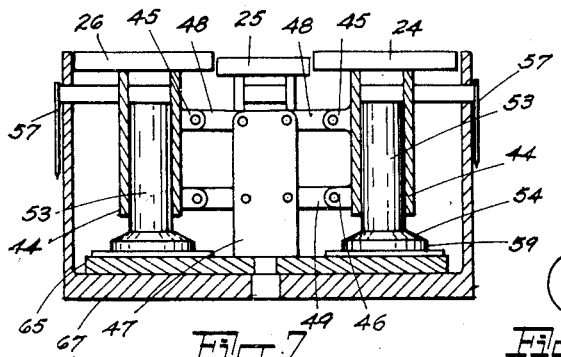
Fig. 7.
Fig. 10.
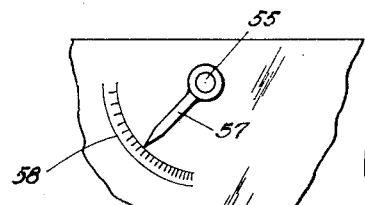
Fig. 8.
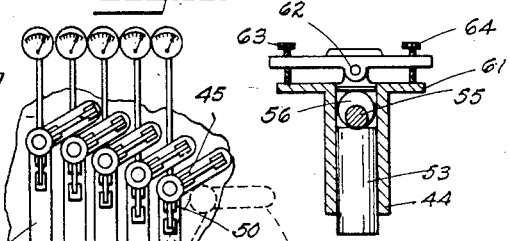
Fig. 9.
Fig. 11.
INVENTOR
Charles Alonzo Roberts Patented Oct. 12, 1937

2,095,268

UNITED STATES PATENT OFFICE 2,095,268

ORTHOPEDIC PRESSURE DISTRIBUTION BALANCE

Charles Alonzo Roberts, Oakland, Calif.

Application September 14, 1935, Serial No. 40,619

16 Claims. (Cl. 73—51)

This invention, an orthopedic pressure-distribution balance for determining malformation throughout the human frame, is used, through the determination of any mal-distribution of pressure, for the purpose of correcting body and orthopedic balance.

The specific purpose of the invention is to ascertain the relative distribution of weight of the body as applied to the various supporting surfaces of the foot, as applied to normal supporting surfaces, and also to any abnormal supporting surfaces, and thereby determine faulty posture, as well as malformation of the foot and other parts of the body frame.

For the purpose of these determinations, the pressure distributions of several pressure balanced individuals, whose feet are of a predetermined normal structure, are taken and averaged to obtain the normal pressures exerted on the various normal supporting surfaces of a normal foot by a body of normal or correct structure.

The generally accepted correct distribution of weight on both feet is as 50:50, and on each foot as 30 on the heel, 15 on the head of the fifth metatarsal, and 5 on the head of the first metatarsal.

It will be found in actual practice that great variations in pressure distribution occur in one pair of feet, as well as between the feet of different persons, due to various malformations, such as fallen arches, flat feet, short leg, spine curvature, obesity, and other defects, and that these defects can be overcome by suitable corrections in the shoes of the individual, by designing the shoes in such manner as to create a proper distribution of pressure throughout the feet. Thus perfect comfort is assured, anticipating that the shoe is otherwise properly fitted.

Without this complete system as hereinafter outlined, the conditions may be readily aggravated by padding or building up in a place which may be apparently correct, but practically wrong.

By the use of this invention, the relative distribution of pressure may be ascertained at a glance, and the shoes may be designed from the values obtained, proper fillers, pads and supports being used to correct distribution of weight to all parts of the foot.

Variations occur, such as where one leg is apparently shorter than the other, and which is determined by the readings of the balance, in which the building up is conducted obversely, that is, the building up is done under the long leg, to correct dropped pelvis or spine curvature, and the readings will signify the cause.

The corrections are always made to remove the cause and gradually bring the frame to normal, as by building up the shoe under the long leg. This procedure will gradually cause the malformed parts to return to a normal position, after which further correction of the shoes may be carried out until structure and shoes are normal.

The main object of the invention, therefore, is to ascertain, by direct reading, the relative distribution of the weight of the body on the different supporting surfaces of the foot and between the feet.

Another object of the invention is to provide means for ascertaining the relative pressure exerted on normally non-supporting areas of the foot and on malformations occurring in the anterior transverse arch, such as callouses, and to obtain relative pressures and distribution with and without the pressure effect of the malformation.

A further object of the invention is to provide the normal degree of divergence of the feet during measurements, to aid in securing accurate determination of normal weight distribution.

A still further object of the invention is to provide a balance for the purpose described in which the depression of the supporting members is practically negligible under load, so as to maintain a normal plane for each supporting surface independently of the planes of the other surfaces.

A still further object of the invention is to provide adjusting means for the various supporting surfaces independently of each other, and all relative to a predetermined horizontal plane, for the purpose of obtaining relative heights with accepted balance pressures, and to provide indicating means for indicating the relative height or degree of adjustment.

Other objects and advantages of the invention will become apparent as the following description is read on the drawings forming a part of this specification, and in which similar reference characters are used to designate similar parts throughout the several views, of which;

Fig. 5 is a plan view of the individual foot support groups in a divergently adjusted position and modified by the omission of the instep support.

Fig. 6 is an enlarged view of one adjustable base member which carries the support members.

Fig. 7 is a section taken on line 7—7 of Fig. 6.

Fig. 8 is a sectional fragmentary view showing the individual adjusting means for the individual supports.

Fig. 9 is a fragmentary view showing the individual support height-indicator.

Fig. 10 is a plan view of a pad adapted for use with the invention to obtain certain determinations, such as drop of the arch, and, Fig. 11 is a fragmentary view showing a modification of the platform or transverse arch supports.

In its simplest form, as shown in Fig. 5, each platform consists of four supporting members, 20, 21, 22 and 23, to respectively support the heads of the first and fifth metatarsals, center of anterior transverse arch and the heel, and each of these members is normally maintained in a horizontal position and in the same predetermined plane, and each member is individually adjustable relative to said predetermined plane and actuates its own weight or pressure indicating device or gauge, and has indicating means for indicating its adjusted height relative to said predetermined plane, as will hereafter be described.

In addition to the above adjustments, the platforms are individually angularly adjustable with respect to each other, about vertical planes, and the heel supports are angularly adjustable relative to the predetermined horizontal plane.

Figures 1, 3:
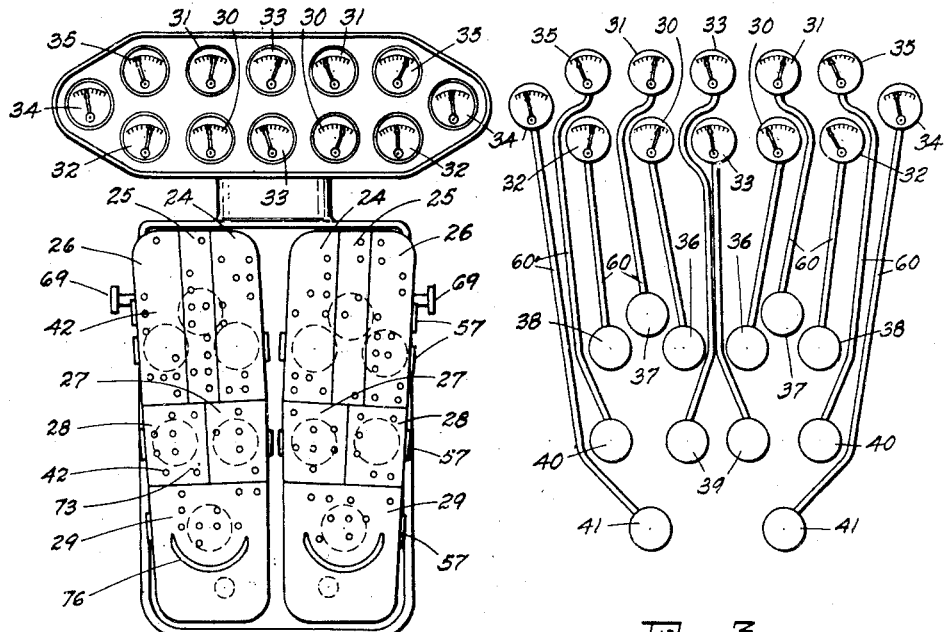
Fig. 1 is a plan view of the invention.
Fig. 3 is a diagrammatic view of the oil connections between the pressure gauges and their actuators.
Figures 2, 4:
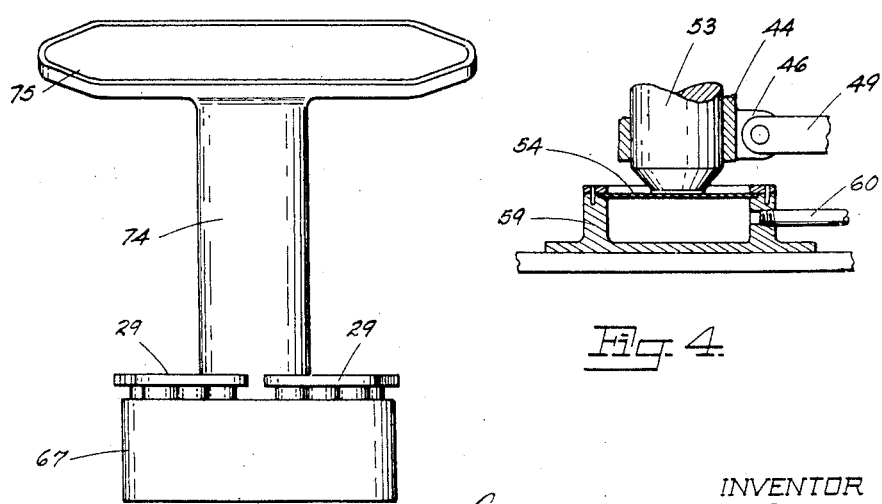
Fig. 2 is a front elevation of Fig. 1.
Fig. 4 is an enlarged fragmentary sectional elevation through one of the gauge actuators.

Fig. 1 shows an improved arrangement which includes supports 24, 25, 26, 27, 28 and 29, respectively for the first and fifth metatarsals and center of anterior transverse arch, two supports for the instep, and one for the heel, these members respectively actuating the weight indicating devices or gauges 30, 31, 32, 33, 34 and 35, through the medium of the diaphragm-actuated fluid-wells 36, 37, 38, 39, 40, and 41.

Fig. 11 shows a further modification in which a separate support is provided for the head of each of the five metatarsals, and they are each individually adjustable to suit the spacing between the metatarsals of various feet.

In addition, pin receiving apertures 42 are provided in all of the members for locating cups or padding 43, to locate abnormal pressure areas, and to create balance, or to determine abnormal or subnormal weight distribution.

Each supporting member, except the heel supports, consists of a pad or plate as 24, which is integral with a stabilizing sleeve 44, which is provided with integral ears 45 and 46 on one side, which are individually linked to a standard 47 through links 48 and 49, and through right-angularly related ears 50, links 51 and standard 52, which substantially non-frictionally retains these sleeves in vertical alignment, there being two pair of right-angularly related links.

Slidably mounted in each sleeve is a pedestal 53, the lower end of which rests on a diaphragm 54.

A shaft 55 rests on top of the pedestal, while the eccentrics 56, which are integral with the shaft, cooperate with the undersurface of the support or pad, as 24, the supporting member being thus adjustably supported on the pedestal, and permitting adjustment of the support relative to a given horizontal plane. An indicating pointer or shaft lever 57 is secured on each shaft and is cooperatively related to indicating or measuring means 58 for indicating the adjustment of the supporting member relative to zero plane, the axis of the shaft thus maintaining at all times its axial position relative to the predetermined or zero plane.

The gauge actuating mechanism consists of a housing 59 sealed by the diaphragm 54, and communicating with the respective gauges through individual flexible tubes 60 as shown, the housing, gauge actuators and tubes being filled with a liquid, such as oil, whereby any pressure applied to the diaphragm will actuate the gauge proportionately to the pressure applied.

Thus it will be noted that the supports may be individually adjusted relative to a zero plane, that the deflection under load is substantially zero, and due to the right-angle parallel links that the supports are maintained in a horizontal or other normal plane and that the full pressure is applied to the diaphragms.

The heel support is provided with means for adjusting the support at any desired angle relative to the horizontal plane, and is shown in its simplest form as consisting of a head 61 integral with the sleeve 44, and having ears 62 on which the support 29 is pivotally supported, set screws 63 and 64 permitting the desired adjustment.

One complete set of supports, as 20, 21, 22 and 23 is mounted on an adjustable base plate 65, which is indicated in its simplest adjustable form as being pivoted at 66 on the main base 67, and adjustable by means of a rod 68 or screw 69, to vary the divergent angle between the two foot supports to the normal angle of the individual's feet.

In Fig. 11, a hook-up is shown for determining the pressures applied through the heads of all five metatarsals, and the same arrangement as previously described is used, except that each metatarsal support is mounted on its own adjustable bracket, as 70, each of which is individually adjustable about its pivot point 71, and individually supported by its own parallel links, as applied in the previous description.

Thus, proper separation of the supports can be obtained for different spacing of the metatarsals, the adjustment of one support being indicated by the dotted lines 72.

Also, a multiplicity of pin apertures 42 are formed in the various supports to permit locating and maintaining pads or cups 43, which are provided with dowel pins 73, at any desired position or point.

A suitable frame with base 67, standard 74, and gauge cabinet 75 is provided, and a heel locator or gauge 76 is mounted on each heel support for positioning the foot.

As will be noted, the platforms are each angularly adjustable so that each assembly of support members is divergently adjustable as a unit with respect to the heel; each support member of each platform is individually vertically adjustable relative to a zero plane, the metatarsal supports are spacedly adjustable, the heel supports are angularly adjustable relative to the horizontal, means is provided for fixing padding devices in any desired position on any or each support member, and each support member is provided with a height indicating device and a pressure gauge.

With the foot support units adjusted to proper divergence and all indicators 57 set at zero, the person stands in normal position on the platforms with their heels within the heel locators. Each gauge will then indicate the weight applied to its own support member, thus obtaining the proportionate weights of the person applied through different parts of the foot.

A reading of all the gauges is then taken and compared to the readings of a person whose frame and feet are normal and in whom no structural faults are present.

The various supports are then individually adjusted to proportionate weight balance, which is indicated by proportionate indications of the various gauges as related to proportionate indications of a normal person, and the adjusted height of the various supports are noted. This gives a direct reading for the proper construction of shoe to create perfect proportionate balance. However, the construction of the shoe in accordance with the readings may not correct the trouble, and the combinations of distributed weights and adjusted heights will clearly point out the cause of unbalance, and it may be necessary, to correct the trouble, to build the shoe oppositely, such as in the case of certain frame faults.

For instance, to correct a dropped pelvis, it is necessary to build up the shoe under the apparent long leg, so as to gradually force the pelvis back in to its proper position.

By this method of comparison, the distribution of pressure and adjustment required, the structural faults in both the feet and frame of the individual are readily determined, and such malformations as flat feet, fallen arch, curved spine, dropped pelvis, are quickly ascertained, and means can be provided for their correction by the proper building up of the shoes.

It will be understood that variations in construction and arrangement of parts, which variations are consistent with the appended claims, may be resorted to without detracting from the spirit or scope of the invention, or sacrificing any of the advantages thereof.

I claim:

1. An orthopedic balance, in combination, a plurality of supporting plates located to individually support the different supporting surfaces of the foot and consisting of a support for the heel, a support each for the heads of the first and fifth metatarsals and a support adjustable at will relative to the plane of the other supports for the anterior transverse arch for indicating malformation intermediate said arch, and weight indicating means associated with each plate.

2. An orthopedic balance, in combination, a plurality of supporting plates located to individually support the different supporting surfaces of each foot, means adjustable at will for adjusting individually the relative heights of said plates and height indicating means associated therewith, and weight indicating means associated with each plate and maintaining substantially zero deflection of the plate under load.

3. An orthopedic balance, in combination, two platforms divergently adjustable at will and consisting each of a plurality of support members including a heel support, means adjustable at will for adjusting the relative heights of the members and height indicating means associated therewith, means for adjusting the angularity of said heel support relative to a horizontal plane, and weight indicating means associated with each member and maintaining substantially zero deflection of the member under load.

4. An orthopedic balance, in combination, a plurality of support members located to individually support the different supporting surfaces of the foot, and consisting of a support for the heel, a support for each side of the instep, and a support for the head of each metatarsal spacedly adjustable at will, means for adjusting at will the height of each member relative to a zero plane, means for adjusting at will the angularity of said heel support, locating means on each member for fixing pads in any desired position, and weight indicating means and height indicating means, associated with each member.

5. An orthopedic balance, in combination, two platforms divergently adjustable at will, each platform consisting of a plurality of support members and means for individually vertically adjusting said members at will, means for spacedly adjusting predetermined support members at will, means for inclinably adjusting one of said support members at will, means for locating pads in fixed position at various points on each member, and weight indicating means and height indicating means associated with each member.

6. In combination, two side platforms, one center platform and one rear platform mounted in the same normal plane to support the sides, center and heel of a foot, means for independently adjusting at will the height of each platform and height indicating means associated therewith, and weight indicating means associated with each platform.

7. In combination, two platforms and means for angularly adjusting said platforms about a vertical axis, each platform consisting of a plurality of support members and weight indicating means associated with each support member, adjusting means for individually adjusting the height of each member relative to a zero plane, said adjusting means including height indicating means for indicating the height of the member relative to said zero plane.

8. In combination, two platforms and means for divergently adjusting said platforms, each platform consisting of a plurality of support members and weight indicating means associated with each support member, one of said support members in each platform comprising a heel support, and means for angularly adjusting each heel support relative to said zero plane.

9. In combination, two platforms divergently adjustable at will, each platform consisting of a plurality of support members and weight indicating means associated with each support member, each of said support members including means for removably retaining a pad in any one of a plurality of locations thereon.

10. In combination, two platforms divergently adjustable at will, each platform consisting of a plurality of support members, and weight indicating means associated with each support member, said support members including a plurality of metatarsal supports, and means for spacedly adjusting said metatarsal supports at will.

11. In combination, two platforms and means for divergently adjusting said platforms, each platform consisting of a plurality of support members, weight indicating means associated with each of said support members, adjusting means for individually adjusting the height of each member relative to a zero plane, said adjusting means including height-indicating means for indicating the height of the member relative to said zero plane, one of said support members in each platform comprising a heel support, and means for angularly adjusting each heel support relative to said zero plane.

12. In combination, two platforms and means for divergently adjusting said platforms, each platform consisting of a plurality of individually operable support members, weight indicating means associated with each of said support members, adjusting means for individually adjusting each member relative to a zero plane said, adjusting means including height-indicating means, each of said support members having means for removably retaining pads in various locations thereon.

13. In combination, two platforms and means for divergently adjusting said platforms, each platform consisting of a plurality of individually operable support members, weight indicating means associated with each of said support members, adjusting means for individually adjusting each member relative to a zero plane, height indicating means associated with each of said adjusting means, said support members including a plurality of metatarsal supports, and means for spacedly adjusting said metatarsal supports at will.

14. In combination, two platforms and means for divergently adjusting said platforms, each platform consisting of a plurality of support members, weight indicating means associated with each support member, one of said members in each platform comprising a heel support, and means for angularly adjusting each heel support relative to a zero plane, each of said support members including means for removably retaining pads in various locations thereon.

15. In combination, two platforms and means for divergently adjusting said platforms, each platform consisting of a plurality of support members, weight indicating means associated with each support member, one of said support members in each platform comprising a heel support, and means for inclinably adjusting each heel support relative to a zero plane, said support members including a plurality of metatarsal supports, and means for spacedly adjusting said metatarsal supports at will.

16. In combination, two platforms divergently adjustable at will, each platform consisting of a plurality of support members, weight indicating means associated with each support member, said support members including a plurality of metatarsal supports, and means for spacedly adjusting said metatarsal supports at will, each of said support members including means for removably retaining a pad in any one of a plurality of locations thereon.

CHARLES ALONZO ROBERTS.